United States Patent
Jaime

(10) Patent No.: US 6,519,892 B1
(45) Date of Patent: Feb. 18, 2003

(54) FISHING ASSEMBLY

(76) Inventor: Walfrido Jaime, 18 E. 21 St., Hialeah, FL (US) 33010

( * ) Notice: Subject to any disclaimer, the term of this patent is extended or adjusted under 35 U.S.C. 154(b) by 0 days.

(21) Appl. No.: 10/002,475

(22) Filed: Nov. 2, 2001

(51) Int. Cl.[7] ............................................. A01K 81/04
(52) U.S. Cl. ....................................................... 43/6.5
(58) Field of Search ........................... 43/6.5, 103, 104, 43/9.1; 114/255

(56) References Cited

U.S. PATENT DOCUMENTS

| | | | | |
|---|---|---|---|---|
| 1,138,541 A | * | 5/1915 | Conekin | 114/255 |
| 1,467,763 A | * | 9/1923 | Lybeck | 114/144 R |
| 1,486,485 A | * | 3/1924 | Frissell | 68/173 |
| 1,489,917 A | * | 4/1924 | Blecker | 43/17.5 |
| 1,606,668 A | * | 11/1926 | Rubach | 406/38 |
| 1,717,835 A | * | 6/1929 | Calhoun | 43/6.5 |
| 1,777,783 A | * | 10/1930 | Burns et al. | 43/6.5 |
| 2,064,408 A | * | 12/1936 | Blecker | 43/6.5 |
| 2,651,874 A | * | 9/1953 | Key | 114/255 |
| 4,458,621 A | * | 7/1984 | De Clifford | 114/255 |
| 4,509,286 A | * | 4/1985 | John | 43/9.1 |
| 4,663,879 A | * | 5/1987 | Bergeron, Jr. | 43/4.5 |
| 5,048,222 A | * | 9/1991 | Correll | 43/104 |
| 5,457,908 A | * | 10/1995 | Sanders | 210/242.1 |
| 5,566,492 A | * | 10/1996 | Swenson | 43/6.5 |

* cited by examiner

*Primary Examiner*—Charles T. Jordan
*Assistant Examiner*—Jordan M Lofdahl
(74) *Attorney, Agent, or Firm*—J. Sanchelima; A. Bordas

(57) ABSTRACT

A fishing assembly comprising two elongated tunnel assemblies mounted to the sides of a watercraft and pivotally mounted at a point adjacent to the rear of the watercraft. A lifting mechanism is used to bring the forward end up and down selectively. When in the down position, the user is fishing for shrimp and scoops up the water in its path along with the shrimp forcing a rearward current that pushes the shrimp over a solid bottom backwards and upwardly. The lateral walls are made out of a mesh of predetermined cooperative dimensions to let the water go through while keeping the shrimp. A U-shape tunnel assembly in the back connects to the elongated tunnel assemblies and routes the shrimp towards the center of the watercraft to a cooperatively positioned aperture through which the shrimp is unloaded.

6 Claims, 3 Drawing Sheets

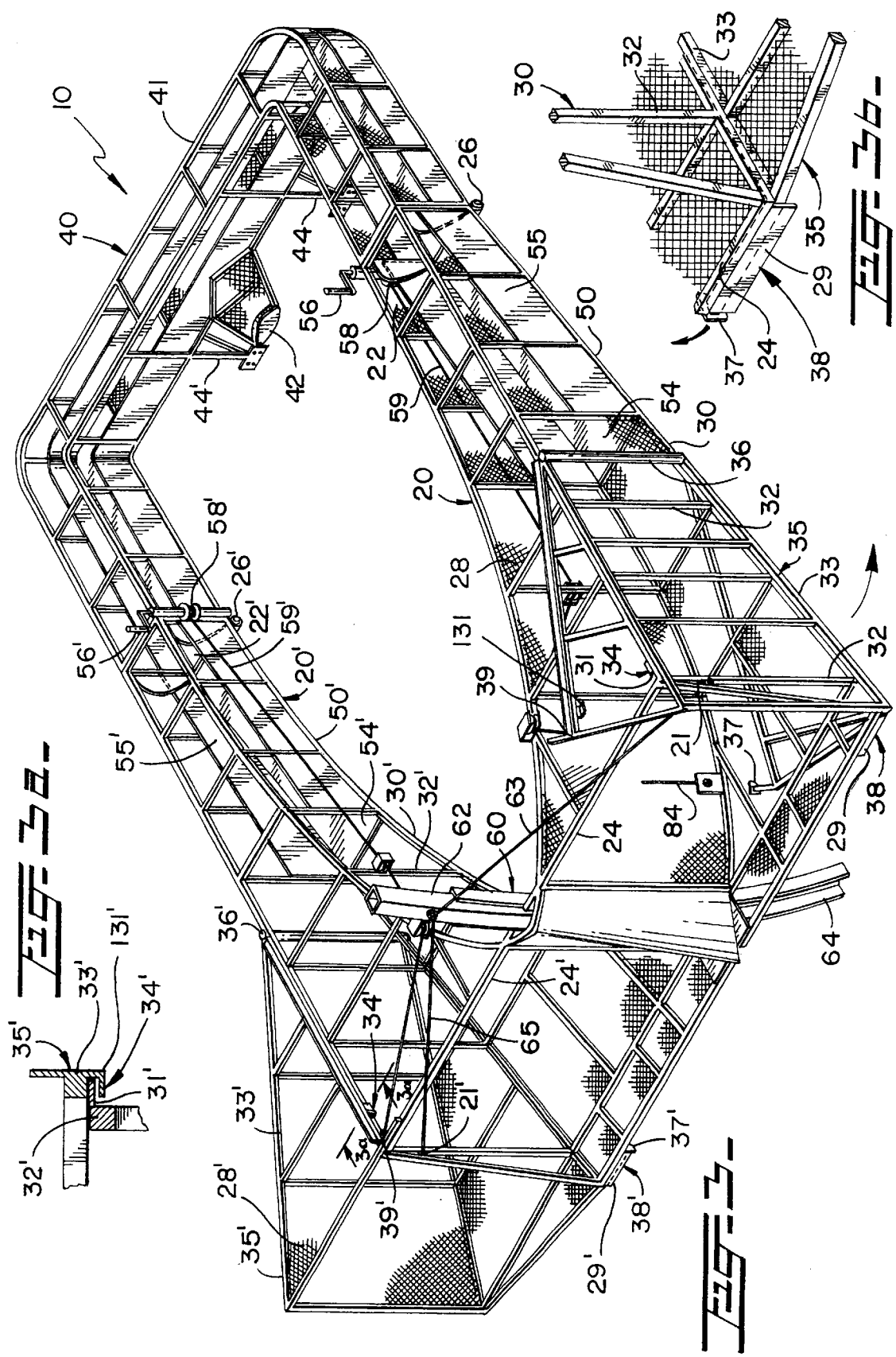

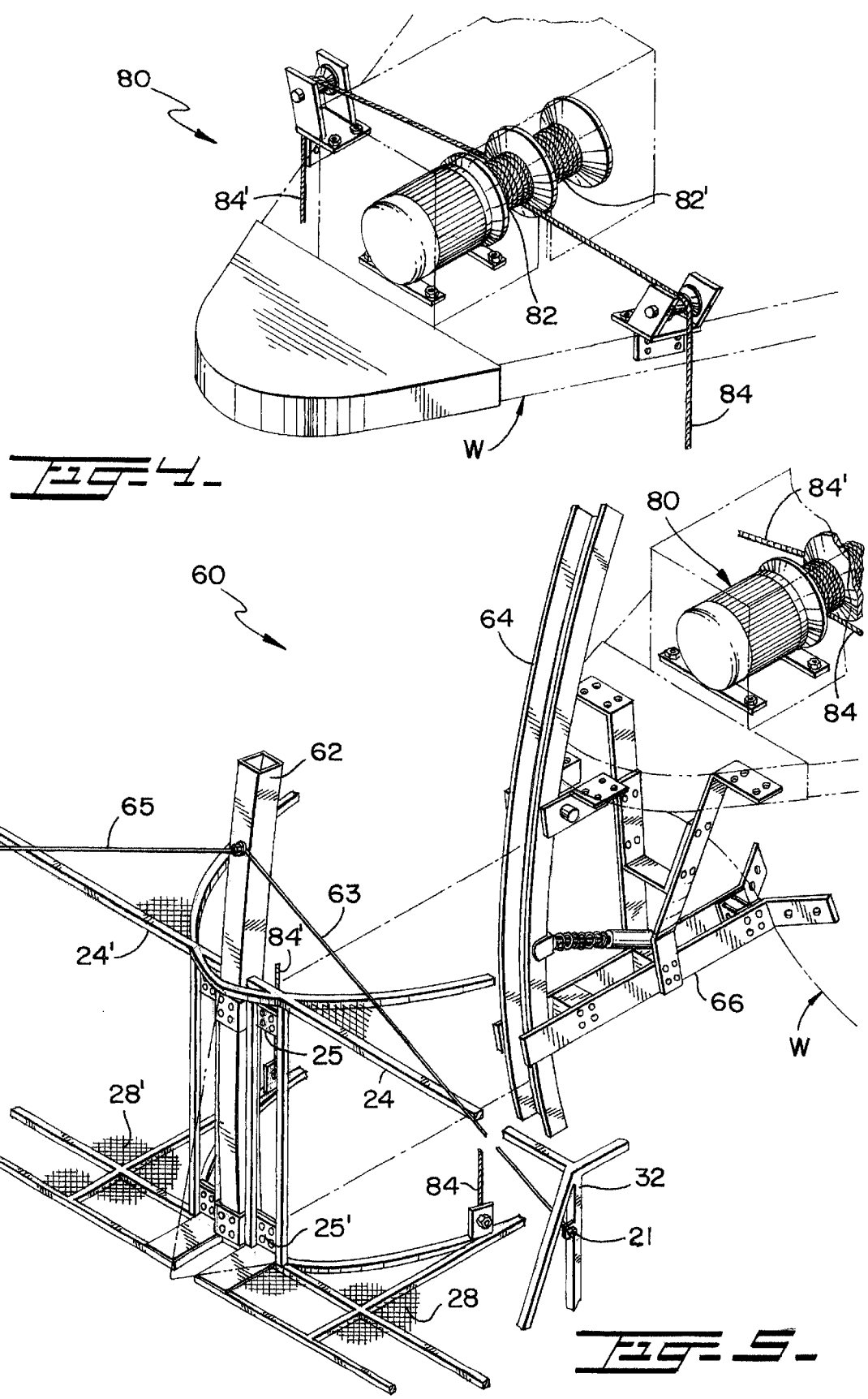

FISHING ASSEMBLY

BACKGROUND OF THE INVENTION

1. Field of the Invention

The present invention relates to a fishing assembly, and more particularly, to an assembly for fishing shrimp.

2. Description of the Related Art

Many designs for fishing assemblies have been designed in the past. None of them, however, include a structure that is mounted to a watercraft and designed to scoop up the shrimp swimming in the path of the cruising watercraft.

Applicant believes that the closest reference corresponds to U.S. Pat. No. 4,509,286 issued to Martin John in 1985 for a trawl shrimp cage. The patented assembly includes a pair of cages corresponding to a pair of nets in submerged position by vessel. However, it differs from the present invention because it fails to disclose an assembly that captures or scoops the shrimp from the front of the boat, creating cooperating currents to push the shrimp to the rear of the boat and them collected inside the boat. John's patented cage includes the use of a net 40 that necessarily entangles the shrimp preventing it from readily reaching cage 30.

Other patents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a fishing assembly that can be used with watercrafts to fish more efficiently with a minimum effort.

It is another object of this invention to provide a fishing assembly that routes the shrimp from the water in the front of the boat to a storage container with minimum handling by the users.

It is still another object of the present invention to provide a fishing assembly that utilizes the force of a cruising watercraft to fish the shrimp and push it towards the rear of the watercraft for ready storage.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 3 represents an isometric view of the fishing assembly with the rigid mesh partially shown. The starboard side extension assembly is shown in the open position. The port side extension assembly is in the closed position.

FIG. 3a shows a detailed view of one of the optional stopper assemblies used for the present invention when extension assembly is in the open extreme position.

FIG. 3b shows a detailed view of the other optional stopper assembly used for the present invention when extension assembly is in the open extreme position.

FIG. 4 is an isometric detail view of the hoist motor assembly used in one of the preferred embodiments for the present invention.

FIG. 5 is an isometric detail view of the lifting mechanism used in one of the preferred embodiments for the present invention.

DETAILED DESCRIPTION OF THE PREFERRED EMBODIMENT

Figure 1:
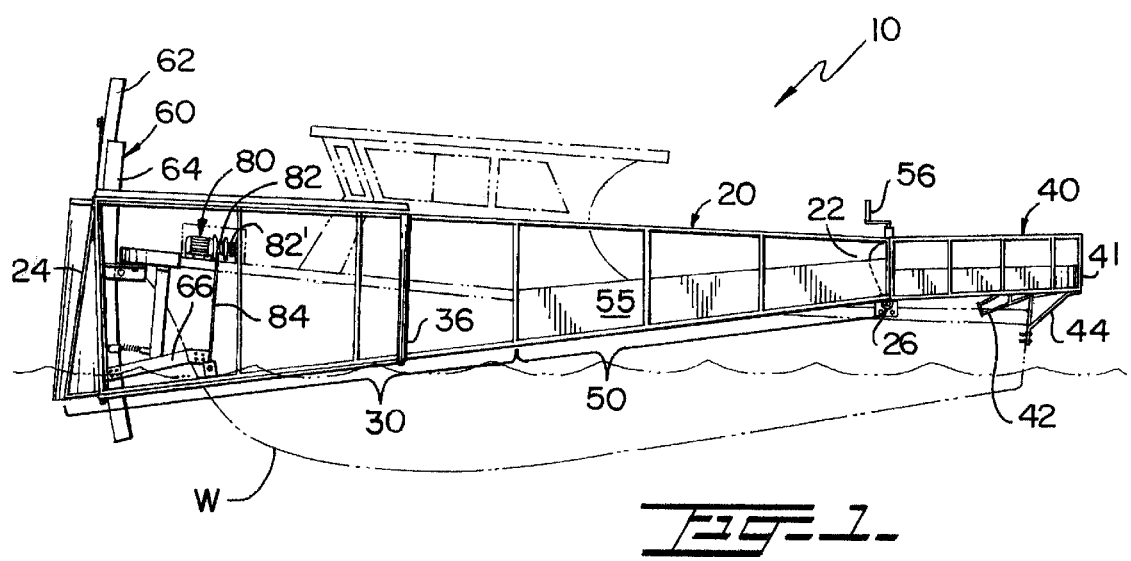
FIG. 1 shows a side elevational view of the fishing assembly incorporating the present invention mounted to a watercraft in the raised position.
Figure 2:
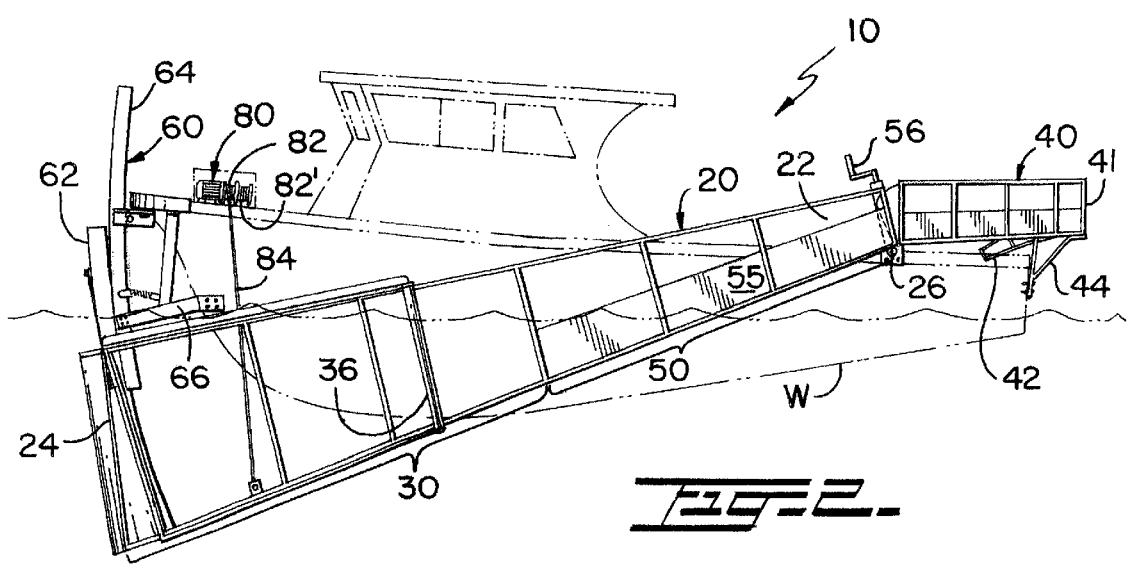
FIG. 2 illustrates a side elevational view of the fishing assembly shown in FIG. 1 in the lowered position as used when fishing.

Referring now to the drawings, where the present invention is generally referred to with numeral 10, it can be observed that it basically includes two tunnel assemblies 20 and 20' mounted to the sides of watercraft W. The tunnel assemblies 20 and 20' are hingedly mounted to watercraft W at rear ends 22 and 22', respectively. Hinge assemblies 26 and 26' are mounted to watercraft W and permit tunnel assemblies 20 and 20' to pivot. Fixed tunnel assembly 40 has a substantially U-shape and connects to rear ends 22 and 22', as best seen in FIGS. 1; 2 and 3. Lifting mechanism 60 raises and lowers front ends 24 and 24'. In the raised position, shown in FIG. 1, assembly 10 does not present any resistance to watercraft W's navigational movement and is the preferred position for cruising. In the lower position, shown in FIG. 2, the assembly 10 is deployed for fishing.

Tunnel assembly 20 (and since they are symmetrical, everything applies to assembly 20' also) has front and rear portions 30 and 50 (and 30' and 50'), respectively. Rear portions 50 and 50' include solid bottoms 54 and 54' and solid lateral walls 55 and 55' that extend about 24 cm. upwardly from the longitudinal edges of bottoms 54 and 54'. Walls 55 and 55' help create a current that pushes the shrimp upwardly to fixed tunnel assembly 40.

Front portion 30 (and 30') has structural members 32 (and 32') defining a substantially rectangular cross-section. Extension assemblies 35 and 35' include structural members 33 and 33' pivotally mounted to hinge assemblies 36 and 36'. As best-seen in FIG. 3, mesh 28 (and 28') covers the skeleton formed by structural members 32 (and 32') and 33 (and 33'). Mesh 28 (and 28') also covers the skeleton rear portion 50 and 50', except on the bottom 54 (and 54') and lateral walls 55 (and 55'). Mesh 28 (and 28') is made out of a rigid material, such as metal or plastic. Lateral walls 55 and 55' extend longitudinally from bottoms 54 and 54'. The rearmost ends of extension assemblies 35 and 35', pivot about hinge assemblies 36 and 36' to selectively open up the entrance to tunnel assemblies 20 and 20'. This increases the effective intake area and fishing capacity of the fishing assembly.

As shown in FIG. 3, extension assemblies 35 and 35' move between two extreme positions. One of them providing the largest effective intake area is limited in travel at the upper portion by headed end 37 (and 37') coming in contact with stopper members 29 (and 29') of stopper assembly 38 (and 38'), as seen on the starboard side on FIG. 3 and the detail of FIG. 3b. At the lower portion, the travel of extension assemblies 35 and 35' is limited by stopper assemblies 34 and 34' shown in the port side of FIG. 3 and the detail of FIG. 3a for stopper assembly 34' (and since they are symmetrical, everything applies to stopper assembly 34 also) where stopper flange 31' (and 31) cooperatively engages within stopper member 131' (and 131).

Turning handle members 56 and 56' are rigidly mounted to the rearmost end of rear portions 50 and 50' respectively. Turning handle members 56 (and 56') is connected to spool member 58 (and 58') on which wire 59 (and 59') is wound. Wire 59 (and 59') is rigidly attached to the front end of extension assembly 35 (and 35') at its inner top portion 39 (and 39'). Washers may optionally be used to prevent friction of wires 59 and 59' with tunnel assemblies 20 and 20'. After the fishing task is concluded, tunnel assemblies 20 and 20' are raised and extension assemblies 35 and 35' are brought to the close position by turning handle members 56 and 56'.

Fixed tunnel assembly 40 is mounted at the rear (stern) of watercraft W. Supporting members 44 and 44' securely fix tunnel assembly 40 to watercraft W. The rearmost portion 41 extends across the stem and includes delivery channel 42, through which the shrimp passes and falls in containers inside watercraft W.

The mechanism 60 for lifting and lowering tunnel assembly 20 (and 20') is shown in FIG. 5. It basically includes arched guiding channel 64 that slidably receives arched elongated member 62. Channel 64 is rigidly mounted to the bow through support member 66. Steel lines 63 and 65 are commonly tied to the top of member 62 and the other ends are connected to point 31 (and 31') adjacent to the top, on the outer portion of the most frontal structural members 32 and 32'. Member 62 is also rigidly mounted to front ends 24 and 24' through plates 25 and 25' respectively. In this manner, the vertical movements of elongated member 62 are transmitted to front ends 24 and 24'. Hoist motor assembly 80 includes two spools 82 and 82' with respective lines 84 and 84', their ends tied to a point adjacent to front ends 24 and 24'.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A fishing assembly, comprising:
   A) first and second elongated tunnel assemblies each having first and second ends, said first ends being pivotally mounted to the sides of a watercraft at a point near the rear of said watercraft, said first and second tunnel assemblies having each a forward and rear portion, said forward portion including first mesh walls and first mesh bottom and said rear portion being connected to said front portion includes second mesh walls and a first solid bottom for scooping some of the water adjacent to said watercraft as it moves thereby producing a rearward current over said solid bottom; and
   B) a rear tunnel assembly having a substantially U-shape with third and fourth ends connected to said first ends of said first and second tunnel assemblies, and said rear tunnel assembly including second mesh walls and a second solid bottom so that said rearward current is routed towards the center of the rear of said watercraft, said rear tunnel assembly further including an opening on said second mesh walls cooperatively positioned to discharge the shrimp being continuously fished.

2. The assembly set forth in claim 1 further including:
   C) lifting means for raising and lowering said second ends.

3. The assembly set forth in claim 2 wherein said first and second tunnel assemblies include first and second movable lateral walls, respectively, pivotally mounted at predetermined distances from said second ends so that the cross-sectional area of said second ends is selectively enlarged.

4. The assembly set forth in claim 3 wherein said movable lateral walls include a mechanism for remotely moving said lateral walls between two extreme positions.

5. The assembly set forth in claim 4 wherein said lifting means for raising and lowering said second ends includes an arched rail member rigidly mounted to the bow of said watercraft and a cooperating arched elongated member slidably receivable within said arched rail member, said arched elongated member being rigidly mounted to said second ends, and further including a hoist motor assembly including at least one spool and a line wound on said spool and said line including an end that is tied to said first tunnel at or about said second end.

6. The assembly set forth in claim 5 wherein said hoist motor assembly includes first and second spools with respective lines and their respective ends tied to said first and second tunnels at or about said second ends.

* * * * *